May 31, 1927.  W. L. BESSOLO  1,630,822
TONGS
Filed Oct. 4, 1922
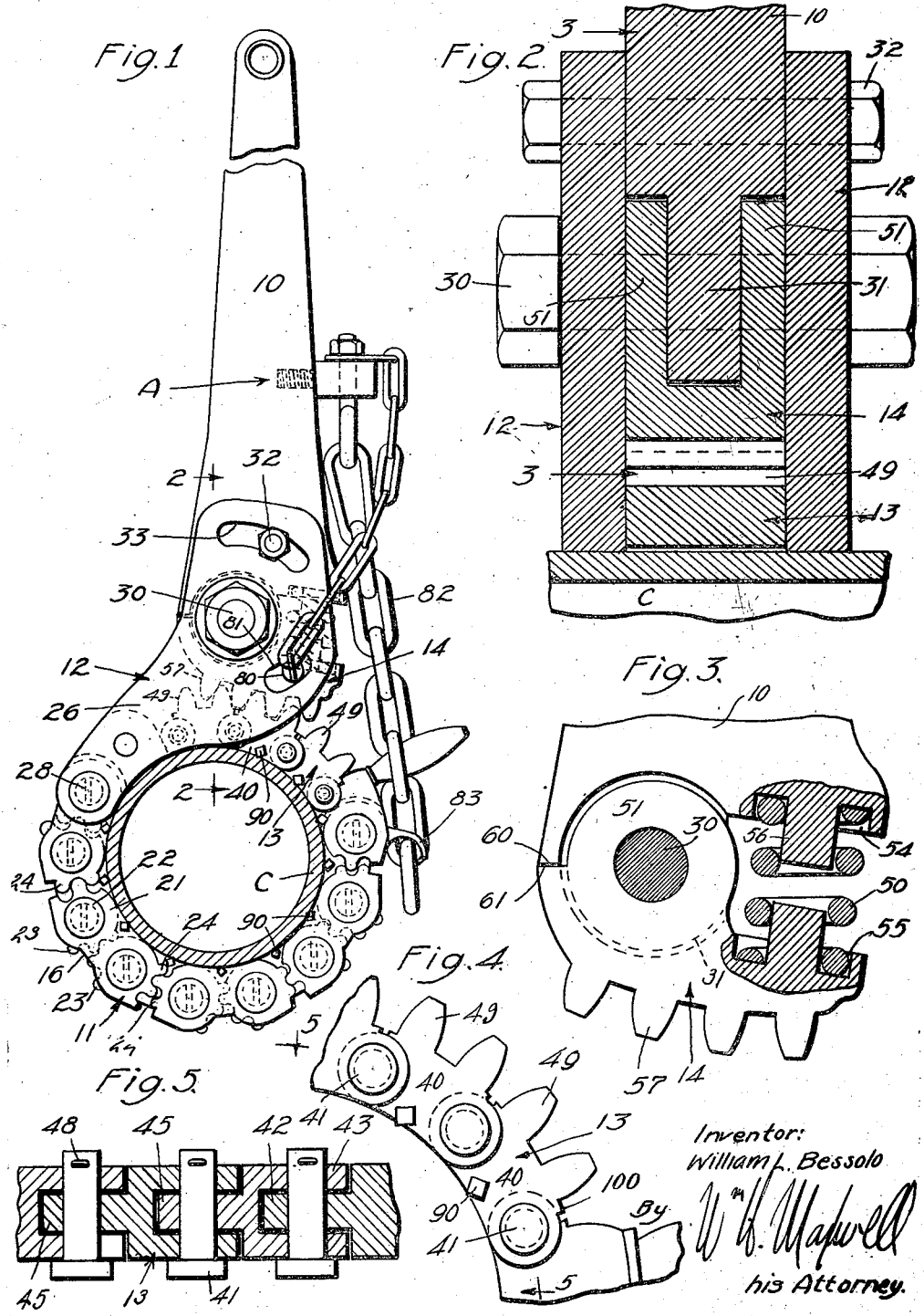
Inventor:
William L. Bessolo
By Wm H. Maxwell
his Attorney.

Patented May 31, 1927.

1,630,822

UNITED STATES PATENT OFFICE.

WILLIAM L. BESSOLO, OF CLEARWATER, CALIFORNIA.

TONGS.

Application filed October 4, 1922. Serial No. 592,365.

This invention has to do with a tool, and particularly with a wrench or tongs, and it is an object of this invention to provide a simple, effective, improved tool of this general character.

This application is a continuation in part of my application for patent entitled Pipe tongs filed December 12, 1921, allowed July 7, 1922, issued March 6, 1923, Patent No. 1,447,920.

It is an object of this invention to provide a tongs which will operate to uniformly grip a casing so that there is no tendency to crush it in at one part.

Another object of the invention is to provide a tongs of the general character set forth in my copending application above referred to with a rack on the casing engaging mechanism which will conform to a casing to effectively grip it and which can be extended to vary the capacity of the tongs.

Another object of this invention is to provide a tongs of the character set forth in the above mentioned copending application with a rack which can be easily removed for purpose of repair or replacement without any appreciable expense or loss of time.

Another object of this invention is the provision of a tong with means which limits the movements of the parts so that they remain in position convenient for operation.

The various objects and features of my invention will be best understood by reference to the following detailed description when taken in connection with the accompanying drawings of one specific embodiment thereof, while its scope will be more particularly pointed out in the appended claims.

In the drawings the Fig. 1 is a plan view of a typical casing tongs embodying the present invention, showing the tongs in operating position on a casing; Fig. 2 is an enlarged detail sectional view of a portion of the tongs shown in Fig. 1, being a view taken as indicated by line 2—2 on Fig. 1; Fig. 3 is a detail sectional view taken as indicated by line 3—3 on Fig. 2; Fig. 4 is an enlarged fragmentary view of a portion of the rack carried by the casing engaging mechanism; and Fig. 5 is a sectional view taken as indicated by line 5—5 on Fig. 4.

The tongs which I have illustrated in the drawings embodies a lever or handle 10, a casing engaging mechanism 11, two plates 12, which connect one end of the casing mechanism 11 with the inner end portion of the handle 10, a rack 13 on the other, or outer, end of the casing engaging mechanism 11, and a rack 14, carried by the inner end of the handle 10 to cooperate with the rack 13.

The handle 10 is preferably a unitary member designed and proportioned so that it carries the other parts of the tongs in a compact effective manner and so that it forms the operating lever of the tongs.

In the particular form of tongs which I have illustrated in the drawings the casing engaging mechanism 11 is a flexible structure, preferably a chain embodying a plurality of blocks 16 and side parts 21 connected by pintle pins 22. The blocks 16 are arranged end to end and the side parts 21 are arranged at the sides of the blocks so that they extend between adjacent blocks. The pintle pins extend through the side parts and blocks to pivotally connect them. The ends of the blocks 20 are formed with gear teeth 23, and the blocks are proportioned and related so that the teeth at adjacent ends of adjacent blocks mesh, as illustrated in Fig. 1 of the drawing. The side parts 21 are formed at their ends with gear teeth 24 and are proportioned and related so that the teeth at adjacent ends of adjacent blocks mesh, as illustrated in Fig. 1 of the drawings. This construction provides a flexible chain, the parts of which are inter-connected so that movement of one part of the chain causes like movement throughout the rest of the chain. This particular form of casing engaging mechanism is fully described and is claimed in the above identified copending application.

In accordance with this invention I provide means for limiting the amount that the chain can be opened or swung out so that it can not be swung so far out that it is inconvenient to close or has to be moved a considerable distance in order to be closed. Although this limiting means may be carried out with various constructions I find it convenient to provide adjacent chain parts with shoulders 100 which will abut to positively limit outward movement of the chain.

The plates 12 are arranged at opposite sides of the inner end portion of the handle 10 so that their outer parts 26 project from the end of the handle to receive the inner end of the casing engaging mechanism 11. A pin 28 connects the inner end of the casing engaging mechanism 11 and the plates 12. The plates 12 are pivotally connected with the inner end portion of the handle 10 by means of a pivot bolt 30 which extends through the plates and through a projection or lug 31, which extends from the inner end of the handle 10. In the particular tongs illustrated in the drawings the plates are limited in their general pivotal movement relative to the handle by a bolt 32 which is carried by the handle 10 and extends through suitable slots 33 provided in the plates 12 as is clearly illustrated in Fig. 1 of the drawings.

The slots 33 are made sufficiently long so that they limit the general movement of the plates relative to the handle to keep the plates and handle in about the proper working relation without interfering in any way with the operation of the tool as hereinafter described.

In accordance with the present invention the rack 13, which is carried on the outer end of the casing engaging mechanism 11, is a flexible rack including a plurality of separate links or blocks 40 pivotally connected by means of suitable pivot pins 41. The inner end of the rack 13 is preferably pivotally connected with the outer end of the casing engaging mechanism 11. In the particular form of construction illustrated in the drawing a projection or lug 42 extends from the outermost block of the casing engaging mechanism between two projections or lugs 43, provided on the inner end of the innermost block 40 of the rack 13. A pivot pin extends through the lugs 42 and 43 to pivotally connect the rack and the casing engaging mechanism. Each of the blocks 40 of the rack 13 is provided at its outer end with a central projection or lug 45 and is provided at its inner end with two spaced lugs 43. The lugs are designed and proportioned so that the lugs at adjacent ends of adjacent blocks cooperate or mesh, as I have clearly illustrated in Fig. 5 of the drawings. The pivot pins 41 extends through the lugs to pivotally connect adjacent blocks. In the form of the invention illustrated in the drawings the pins 41 are straight pins, held in place through the lugs by means of suitable cotter keys 48. Each of the blocks 40 of the rack 13 is provided at its outer side with gear teeth 49. The gear teeth 49 on the blocks 40 and the pivotal connections between blocks 40 are designed and proportioned so that the rack 13 is flexible and can conform to a casing and so that the gear teeth 49 of the several blocks form a series of teeth which will properly cooperate with the teeth of the rack 14. It is to be particularly noticed that the construction of the blocks 40 allows them to be interchanged and also allows for extending the rack 13 by simply adding blocks to its outer end.

In accordance with the present invention the rack 14 is pivotally mounted on the inner end of the handle 10 and is normally yieldingly held in an out position by means of a spring 50. In the particular form of the invention illustrated in the drawings the rack 14 is provided with projections or lugs 51 which fit over the projection 31 on the end of the handle 10 and receive the pivot bolt 30 so that the pivot bolt acts to pivotally connect the rack 14 with the handle as well as to pivotally connect the plates 12 with the handle. The spring 50 is a comparatively heavy compression spring, preferably a helical spring, arranged between the inner end of handle 10 and the inner side of the rack 14. In accordance with the preferred form of construction the ends of the spring 50 extending into recesses 54 and 55 provided in the end of the handle 10 and the inner side of the rack 14, respectively. Further, it is desirable to provide projections or studs 56 on the end of the handle and on the inner side of the rack 14 to extend into the spring 50 to aid the recesses 54 and 55 in holding the spring in position between the racks and the end of the handle. The series of gear teeth 57 at the outer side of the rack 14 is eccentric relative to the pivotal connection between the plates 12 and handle 10, as I have clearly illustrated in Figs. 1 and 3 of the drawing. The gear teeth 57 are designed and proportioned so that they will effectively cooperate with the gear teeth of the rack 13. In accordance with the present invention the rack 14 is formed with shoulder 60 which cooperates with a shoulder 61 on the end of the handle 10 to limit the amount the rack 14 can be moved outwardly by the spring 50. In practice the parts are arranged and proportioned so that the spring 50 is somewhat compressed and therefore holds the rack 14 out with considerable force when the rack is in its out position and the shoulders 60 and 61 are in cooperative engagement. When it is desired to limit the amount the rack 14 can be forced or moved inwardly against the resistance of spring 50 the studs 56 can be proportioned so that they contact when the rack reaches its innermost position. From inspection of the drawings it will be obvious that the rack 14 is of extremely simple inexpensive formation and that it can be easily and quickly removed, upon removal of the pivot bolt 30, for the purpose of repair or replacement.

In the particular tongs illustrated in the drawings the bolt 32 cooperates with the slots 33 and the plates 12 to limit the general pivotal movement in the plates relative to the handle 10. In addition to this means the tongs is provided with a pin 80 which is removably carried by the handle 10 and extends through slots 81 in the plates 12 to limit the pivotal movement of the plate 12 relative to the handle 10 when the tongs are in operation. The pin 80 and slots 81 may be proportioned and related so that they limit the movement between the handle and plates to prevent releasement of the rack 13 from between the rack 14 and pipe C. Further, as a safety device a chain 82 is attached to the handle 10 and is adapted to be arranged in connection with a hook 83 on the outer end portion of the casing engaging mechanism 11 to hold the casing engaging mechanism in the operative position as is illustrated in Fig. 1.

The operation of the present tongs is more or less similar, generally, to the tongs set forth in the above copending application. To apply the tongs to a casing "C", the casing engaging mechanism 11 is opened out, that is the outer end of the mechanism 11 is swung away from the handle until it will receive the casing. With the casing engaging mechanism opened out the tongs is brought into engagement with the casing the handle 10 being in position to allow the casing engaging mechanism 11 to be closed and the rack 13 to be extended between the plates 12 so that it is between the end of the handle 10 and the casing "C". During the closing of the casing engaging mechanism 11 it automatically operates throughout its length so it uniformly fits or engages the casing when it is in the closed position. When the rack 13 is in place between the end of the handle 10 and the casing "C" the handle is swung somewhat in the direction indicated by the arrow "A" to bring the teeth of the rack 14 into cooperative engagement with the teeth of the rack 13. The safety pin 80 is then arranged through the slots 81 and in the handle 10 to prevent movement of the handle relative to the plate such as would allow the rack 14 to move out of engagement with the rack 13, and the chain 82 is arranged in connection with the hook 83. The tongs is then ready to be actuated. To actuate the tongs the handle 10 is moved further in the direction indicated by the arrow "A" so that the rack 14 cooperates with the rack 13 to move the rack 13 between the end of the handle 10 and the casing "C" causing the casing engaging mechanism 11 to draw tightly around the casing. The flexibility of the rack 13 allows it, as well as the casing engaging mechanism 11, to conform to the casing and thus effectively grip it. The rack 14 being eccentric to the pivot bolt 30 is moved toward the rack 13 as the handle is operated in the direction illustrated by the arrow "A". However, the spring 50 back of the rack 14 yieldingly holds the rack 14 in engagement with the rack 13 so that the rack 14 does not operate to force the rack 13 against the casing "C" in a manner to crush it. In practice, I prefer to make the spring 50 of such strength that it will unfailingly hold the rack 14 in cooperative engagement with the rack 13 during operation of the tongs so that the racks cooperate to hold the casing engaging mechanism 11 tightly around the casing without exerting any excess pressure against the casing at the racks. If the desired gripping of the casing cannot be had by the pulling of the casing engaging mechanism 11 around the casing by means of the cooperation of the racks the handle can be actuated until the studs 56 come together whereupon further actuation of the handle will positively force the rack 13 against the casing "C" so that it solidly grips it. In practice it is desirable to provide gripping members 90 at the inner part of the casing engaging mechanism and rack 13 to engage the casing and prevent slippage of the tongs on the casing. From the foregoing description it will be obvious that the present tongs may be effectively used on casings of various sizes and that its capacity can be greatly varied by varying the length of the rack 13 and, if necessary, by mounting racks 14 of different lengths or configurations and the end of the handle 10. Ordinarily the capacity of the tongs can be varied effectively by simply varying the length of the rack 13.

Having described only a typical preferred form of my invention I do not wish to limit myself to the particular details hereinabove set forth but wish to reserve to myself any changes or variations that may appear to those skilled in the art and that may fall within the scope of the following claims.

Having described a preferred form of my invention, I claim:

1. A tool of the character described including, an operating lever, a casing engaging mechanism, and means for operating said mechanism from the lever including a flexible rack connected with the casing engaging mechanism, an eccentric rack pivotally mounted on the lever, and a spring holding the eccentric rack in position to cooperate with the first mentioned rack to operate the casing engaging mechanism.

2. A casing tongs including, an operating lever, a casing engaging mechanism having one end pivotally connected with the lever, a rack at the other end of the casing engaging mechanism, and a rack pivotally mounted on the lever concentrically with the connection of the casing engaging mechanism with the lever and having its series of teeth eccentric to said point of pivotal connection, and a spring in connection with the rack connected with the lever to hold it in position to cooperate with the first mentioned rack to operate the casing engaging mechanism.

3. A casing tongs including, an operating lever, a casing engaging mechanism having one end pivotally connected with the lever, a flexible rack at the other end of the casing engaging mechanism, having a continuous series of gear teeth and a rack pivotally mounted on the lever concentrically with the connection of the casing engaging mechanism with the lever and having its series of teeth eccentric to said point of pivotal connection, and a spring in connection with the rack connected with the lever to hold it in position to cooperate with the first mentioned rack to operate the casing engaging mechanism.

4. A casing tongs including, an operating lever, a casing engaging mechanism, a rack, a single pin pivotally connecting both the rack and one end of the casing engaging mechanism with the lever, so that the series of gear teeth of the rack is eccentric to the pin, and a flexible rack connected with the other end of the casing engaging mechanism and adapted to cooperate with the first mentioned rack.

5. A casing tongs including, an operating lever, a casing engaging mechanism having one end connected with the lever, a rack pivotally mounted on the lever, a lug on the rack, a lug on the lever, a spring held between the rack and lever by the lug on the rack and the lug on the lever to hold the rack away from the lever, and a rack carried by the other end of the casing engaging mechanism and adapted to cooperate with the first mentioned rack.

6. A casing tongs including, an operating lever, a casing engaging mechanism having one end connected with the lever, a rack pivotally mounted on the lever, means for limiting outward movement of the rack relative to the lever, a lug on the inner part of the rack, a lug on the lever, a spring held between the lever and rack by the lugs to hold the rack out, and a rack carried by the other end of the casing engaging mechanism and adapted to cooperate with the first mentioned rack.

7. A casing tongs including, an operating lever, a flexible casing engaging mechanism, a rack, a single removable pin pivotally connecting both the casing engaging mechanism and the rack with the lever, the series of teeth of the rack being eccentric to the pin, means limiting outward movement of the rack relative to the lever, the rack having a recess in its inner part, the lever having a recess, lugs in the recesses, a helical compression spring arranged over the lugs with its ends in the recesses, and a flexible rack carried by the other end of the casing engaging mechanism to cooperate with the first mentioned rack.

In witness that I claim the foregoing I have hereunto subscribed my name this 20 day of Sept., 1922.

WILLIAM L. BESSOLO.